Sept. 4, 1973 C. C. PARKER ET AL 3,756,866
METHOD AND MANUFACTURING MAGNETIC ALLOY PARTICLES HAVING SELECTIVE COERCIVITY
Filed June 30, 1970
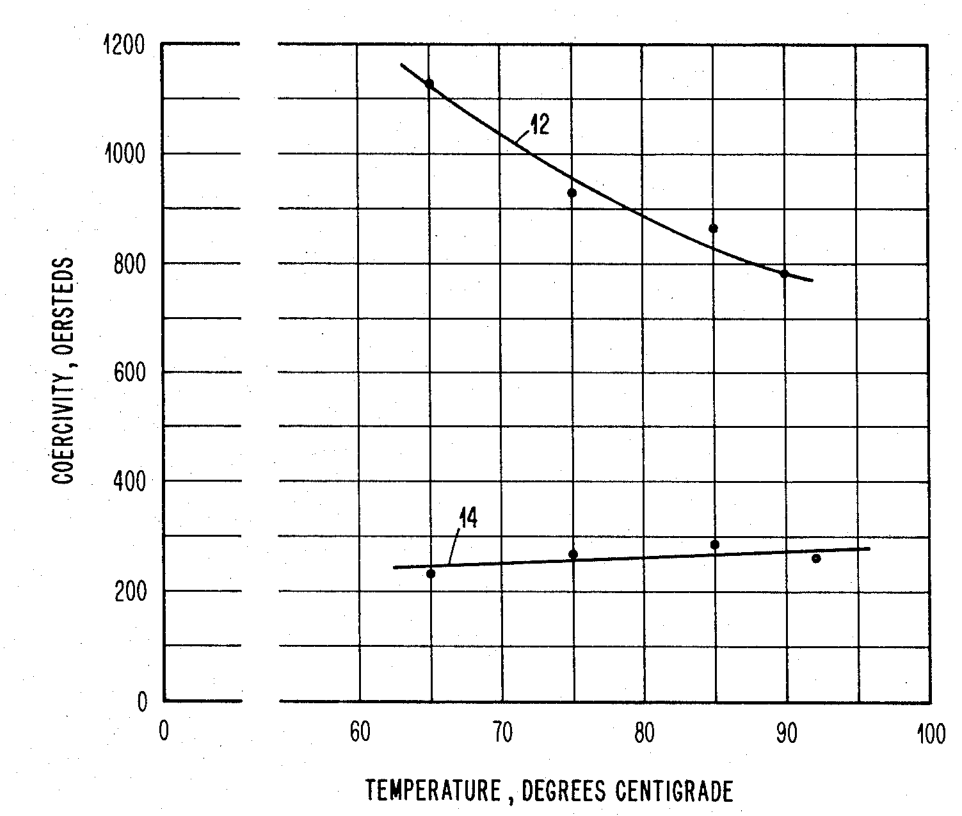
INVENTORS
CHARLES C. PARKER
RHODES W. POLLEYS
JOSEPH S. VRANKA
BY Donald W. Margolis
ATTORNEY United States Patent Office 3,756,866
Patented Sept. 4, 1973

3,756,866

METHOD AND MANUFACTURING MAGNETIC ALLOY PARTICLES HAVING SELECTIVE COERCIVITY

Charles C. Parker, Longmont, and Rhodes W. Polleys and Joseph S. Vranka, Boulder, Colo., assignors to International Business Machines Corporation, Armonk, N.Y.

Filed June 30, 1970, Ser. No. 51,051
Int. Cl. H01f *1/06*
U.S. Cl. 148—105 6 Claims

ABSTRACT OF THE DISCLOSURE

Magnetic cobalt-phosphorus particles having selectively controlled high coercivity are provided by controlling the temperature at which chemical decomposition is initiated in a basic bath of the cobalt cation-hypophosphite anion type which is free of strong complexing agents and in which the source of hydroxyl ions is a non-complexing base. By controlling the reaction temperature of such a solution, in the absence of strong complexing agents and including a non-complexing base, small uniform cobalt-phosphorus particles having high coercivities, in the range of 750 to 1200 oersteds, with a marked inverse dependence upon temperature are obtained.

BACKGROUND OF THE INVENTION

Field of the invention

This invention relates to a novel method for preparing finely divided magnetic alloy particles having selective high coercivity by controlled chemical reduction from solution. Such particles are suitable for use in magnetic recording media, permanent magnets, magnetic cores, and in magnetically responsive fluid suspensions, such as magnetic or electrostrictive clutch couplings or the like.

Description of the prior art

In the prior art, magnetic particles of the free metal, alloy and oxide types, have been prepared in numerous ways. In one common type of preparation, cobalt, iron, and nickel compounds are prepared, often by chemical precipitation, and then decomposed, oxidized, and/or reduced to produce either oxide, metal, or alloy magnetic particles. In another type of preparation, solutions of cobalt, iron, or nickel salts are subjected to reduction at the cathode of an electrolytic cell to produce continuous magnetic films or particles. In yet another technique, solutions of cobalt, iron, and nickel salts are subjected to chemical reduction by the action of a reducing agent on the metal cations. In the prior art, such chemical or electroless reduction procedures have most often been carried out to produce continuous films or coatings. The pioneering effort with regard to electroless cobalt plating is detailed in U.S. Pat. 2,532,284. In such electroless plating procedures, reducing agents have commonly been of the hypophosphite, boron-nitrogen, borohydride, or organic formate type. It has been observed that in such electroless film plating procedures the plating bath is sometimes subjected to spontaneous decomposition, whereby a large portion of the metal cation content of the solution is vigorously and quickly reduced to a metallic state. The resulting deposited material is normally a mixture of discontinuous film and particles covering a wide range of sizes, shapes, and coercivities. It has been determined that such catastrophic decomposition during film plating is usually brought about by a combination of excessive heating of the electroless solution, a change in pH, the build up of nucleating material, such as insoluble salts, or the addition of catalytic material to the bath. Furthermore, since the material plated in an electroless bath is itself normally auto-catalytic to the decomposition reaction, once uncontrolled decomposition begins, it increases in an avalanching manner so that plate-out or spontaneous chemical reduction of the bath is irreversible and accomplished in a very short time.

As has been already noted, electroless plating baths have been most often used in the prior art to produce continuous films. Development of related technology has been heavily aimed at achieving means to avoid spontaneous decomposition. In a few instances electroless-type baths have been used to intentionally produce particles. In this regard, finely divided particles having uniform size and good magnetic characteristics have been produced by controlled initiation of the decomposition reaction with catalytic metals or their salts, while utilizing temperature, pH, and concentration parameters to vary the physical properties, primarily the size, of the particles. To the extent the magnetic properties are a function of size, they are also affected by these parameters. The catalytic material most often used for initiating controlled chemical reduction of magnetic metal salts to form particles has been finely divided palladium metal and salts of palladium. Recently, production of uniform particles has been reported as having been accomplished by halting the initial palladium catalyzed reaction, removing the catalytic reaction particles, and then utilizing the residual seeding mixture with additional quantities of metal salts and reducing agents, to produce additional metal alloy particles of controlled size. Also of interest is the initiation of particle production without utilizing catalytic materials within the bath as reported in co-pending, commonly assigned, application S.N. 812,433, in which a combination of amine borane and hypophosphite reducing agents is utilized to initiate production of metal alloy particles.

Control of magnetic chaarcteristics of continuous alloy films deposited from electroless plating baths has been investigated and reported extensively. Perhaps the most complete report of the relationships between the coercivity of electrolessly plated cobalt films and bath parameters is to be found in U.S. Pat. 3,138,479. This reference teaches control of cobalt film coercivity by the combined control of pH (with $NH_4OH$) in the range of 7 to 9, agitation up to 350 r.p.m., sodium hypophosphite concentration, temperature in the range of 140° to 200° F. (60° to 93° C.), and other parameters which are not germane to particle preparation, such as substrate preparation and film thickness. Of great interest with respect to the present invention was the discovery reported in this reference that while each of these parameters had some combined effect on coercivity, pH is the most critical. U.S. Pat. 3,138,479 also reports, with regard to bath temperature, that it has relatively little effect on the magnetic properties of electrolessly plated cobalt film, with relatively low temperatures being preferred in order to minimize loss of volatile ammonia from the bath. Until recently, little effort has been devoted to the study of control of magnetic properties of cobalt particles produced by decomposition of electroless baths. Results of such a study now indicate that the coercivity of magnetic particles thus produced are affected in many ways which would be predictable from a knowledge of electroless plating. It also indicates that coercivity is suprisingly unaffected by other parameters. In any event, it has been clearly determined that there is a marked change in the magnetic characteristics of an electrolessly plated film which is removed from a substrate and then ground to particle size.

Neither cobalt film nor cobalt particles can be produced from an electroless bath which is not basic. Most work on the production of continuous cobalt-phosphorus films by electroless plating has been done in basic baths in which the pH is controlled with ammonium hydroxide.

However, other bases have been used in these bath compositions. Ingredients which form complexes or chelates with cobalt cations are also normally included in electroless plating baths. One of the chief reasons for utilizing complexing agents in a bath is to prevent the formation of cobalt hydroxide. Complexing and chelating agents include, for example, ammonia, the primary, secondary and tertiary amines, imines, mono- and di-carboxy groups, saturated unsubstituted short chain aliphatic dicarboxycylic anions, and hydroxy groups. Control of coercivity in electrolessly plated cobalt film by controlling the concentrations or ratios of complexing and of chelating agents has been taught, for example, in U.S. Pats. 3,360,397; 3,423,214; and 3,446,657 and Tsu et al.: IBM Technical Disclosure Bulletin, volume 4, No. 8, page 52, January 1962. However, other than the requirement that the temperature be practically operative, no relationship between complexing agents, hydroxyl ion source, and bath temperature to control film coercivity is known to have been reported.

The present invention provides a highly effective technique for producing finely divided magnetic cobalt-phosphorus particles having selectively controlled high coercivity by controlled decomposition of a bath having a selected temperature, and in which the hydroxyl ions are provided by a non-complexing base.

The production of magnetic recording media, for example, including particles having controlled coercivity is critically important for data processing uses. This is so because such magnetic compositions require that they be fabricated to possess a predetermined coercivity and thereby function predictably as tapes, loops, drums, disks, and the like. The coercivity desired may vary from one application to another. It is therefore seen that there is a great need for a technique for forming magnetic particles having predictable and reproducible controlled coercivity.

SUMMARY OF THE INVENTION

It is an object of the present invention to provide new and improved techniques for manufacturing finely divided magnetic cobalt-phosphorus alloy particle compositions having selectively controlled high coercivity.

Another object of this invention is to provide a cobalt-phosphorus alloy particle composition in finely divided form having selected magnetic properties suitable for use, for example, in magnetic recording media, permanent magnets, magnetic cores, and in magnetically responsive fluid suspensions.

It is a further object of this invention to provide a method of making magnetic cobalt-phosphorus particles from an electroless type of cobalt bath that allows the choice of the coercivity magnitude of the resulting cobalt-phosphorus particles by utilizing a non-complexing base and bath and controlling the bath temperature.

The present invention also relates to a method of making finely divided magnetic cobalt-phosphorus alloy particles by dissolving a salt of cobalt in a bath, rendered basic by a non-complexing source of hydroxyl ions and reducing the metal salt with hypophosphite anion while selectively controlling the temperature of the bath, thereby precipitating cobalt-phosphorus particles with selectively controlled high coercivity by chemical oxidation-reduction.

These and other objects are accomplished in accordance with the broad aspects of the present invention by providing any soluble cobalt salt dissolved in a solvent with any soluble source of hypophosphite anion and heated to a selected temperature in the range of about 60° to 95° C. A separate heated solution of catalytic material, such as palladium chloride, is prepared and added to the cobalt cation-hypophosphite solution, while maintaining the entire mixture neutral or in its natural state of slight acidity due to hydrolysis. No reaction, other than the possible formation of small amounts of palladium particles, occurs in this non-basic bath. Selective control of the bath temperature is continuously maintained. When a solution of non-complexing basic material heated to a similar temperature is added to the mixture, a blue gelatinous precipitate or flocculate of cobalt hydroxide is formed instantaneously followed by reduction to and precipitation of black cobalt-phosphorus alloy after a short time. In an alternative technique for producing cobalt alloy particles, a selectively heated solution of cobalt salt, reacted with any non-complexing base to form cobalt hydroxide precipitate and any source of hypophosphite anion, have added thereto a similarly heated solution containing pallladium chloride or any catalytic material therein. In this latter technique, cobalt-phosphorus particles will form after several minutes even without the addition of catalytic material. Yet another technique for producing alloy particles is the preparation of a temperature controlled solution of non-complexing base, hypophosphite anion and catalytic material to which a soluble cobalt salt solution is added. Finally, cobalt cation, non-complexing base, and catalytic material may be mixed and a solution of hypophosphite added thereto. In any of these procedures, one or more of the constituents may be added as the dry salt to a heated bath rather than as a heated solution. Following cobalt-phosphorus preparation by any of these equivalent techniques, precipitated magnetic particles are separated from solution by filtering, decanting, centrifuging, magnetic separation, or any other suitable means.

Small uniform cobalt-phosphorus alloy particles having selectively controlled high coercivities are formed by these reactions. The particles thus produced exhibit coercivities having an inverse dependence upon deposition bath temperature and independent of pH, so long as it is basic, hypophosphite anion concentration and percent phosphorus in the alloy. The discovery of these relationships is very important.

Alloy particles produced in accordance with this invention display high intrinsic coercivities in the range of about 750 to 1200 oersteds, depending on the reaction temperature. The saturation magnetization per gram, $\sigma_s$, ranges from about 100 to 120 electromagnetic units per gram. They are in the form of finely divided uniform particles about 0.01 to 3 microns in diameter, with the vast majority between 0.04 and 0.1 micron in diameter.

The foregoing and other objects, features and advantages of the invention will be apparent from the following more particular description of preferred embodiments as illustrated in the accompanying drawing.

BRIEF DESCRIPTION OF THE DRAWING

The figure is a graphical illustration wherein the abscissa of said graph is temperature in degrees centigrade and the ordinate is coercivity in oersteds, said graph showing the variation of coercivity in particles of cobalt-phosphorus produced by chemical reduction from a weakly complexed bath rendered basic with a non-complexing base over a critical range of temperatures and for the prior art bath rendered basic with a strongly complexing base.

DESCRIPTION OF THE PREFERRED EMBODIMENTS

In the following examples, all solutions were prepared with distilled water and reagent grade chemicals. Unless otherwise clearly indicated, the total volume of the reaction mixture was approximately one liter. In order to bring the solutions together rapidly and completely, agitation via gentle stirring was normally employed. Particles produced by the method of the present invention were separated from the reaction mixture, usually magnetically, and washed with water and acetone. The particles were then dried, usually under non-oxidizing conditions with precautions taken to avoid exposing the particles to oxygen, prior to and during drying.

Powder samples of the alloys tested were measured with a vibrating sample magnetometer, VSM, to determine their magnetic properties. Determination of the chemical content of the alloy particles was obtained by both X-ray fluoresence and neutron activation. Particle sizes and shapes were determined from electron micrographs of the particles.

While the products of the present invention consist predominantly of cobalt, there is normally associated therewith small, but significant quantities of phosphorus and oxygen, as indicated by analysis. It would appear that during the course of reduction of the metal cations to metal, a small amount of the phosphorus in the hypophosphite anion is oxidized to the neutral state. The resulting phosphorus formed thereby, is co-precipitated with the reduced metal to form an alloy. It further appears that during the washing and drying steps of the method, some small degree of oxidation of the surfaces of the particles occurs with the result that the final product contains oxygen which is limited almost entirely to the skin or shell of the particle. Techniques to completely avoid surface oxidation are known in the art.

The preferred ranges of composition of the cobalt plating bath are given in grams per liter in the following Table I.

TABLE I

| | Preferred |
|---|---|
| Cobaltous cation ($Co^{++}$) | 6.0–8.0 |
| Hypophosphite anion ($H_2PO_2^-$) | 9.0–20.0 |

The cobalt cation is provided by the use of any suitable soluble cobalt salt, such as cobalt chloride, cobalt sulfate, cobalt acetate, cobalt sulfamate, and others. The hypophosphite anion is normally brought into solution in the form of an alkaline hypophosphite. Outside of the preferred concentrations, the present invention is operative utilizing either trace amounts or saturated solutions of the oxidizing and reducing agents. In the preferred embodiments, weak complexing agents, such as citrates and malonates, are brought into solution in the form of the acid or as an alkaline salt in varying ion concentrations. Ammonium and ammonium salts provide strong complexes with cobalt in the form of cobaltous hexamine, $Co(NH_3)_6^{++}$. Therefore, ammonium compounds and other strong complexing agents are excluded from the bath as completely as possible. Hydroxide cations are brought into solution to maintain a reaction pH of from about 7.1 to 13. Bases other than ammonium hydroxide, and preferably in the form of a base whose cation portion does not complex with cobalt cation are utilized. Alkaline hydroxides, such as sodium hydroxide and potassium hydroxide, are preferred.

With further regard to complexing constituents, it is specifically required as a part of this invention that no complexing agents having a stronger or more stable attraction for the cobalt cation than the hydroxide anion be present in the bath in sufficient quantity to prevent the formation of blue cobalt hydroxide precipitate, $Co(OH)_2$ prior to alloy formation. As used herein, the terms "strong complex," "strong complexing agent," and "complexing base" are intended to mean an ingredient which combines with cobalt cation in solution to form a stable complex which prevents the formation of cobalt hydroxide precipitate when the solution is rendered basic prior to alloy formation. The terms "weak complex," "weak complexing agent," "non-complexing," and "non-complexing base" are defined to mean ingredients which when present with cobalt cation in solution do not form a stable complex, or if they do form a complex, it does not prevent the formation of cobalt hydroxide precipitate in a basic solution prior to alloy formation.

The following examples are given merely to aid in the understanding of the invention, and variations may be made by one skilled in the art without departing from the spirit of the invention.

EXAMPLE I

An aqueous solution containing 35 g. cobalt sulfate ($CoSO_4 \cdot 7H_2O$), 35 g. sodium citrate ($Na_3C_6H_5O_7 \cdot 2H_2O$) and 20 g. sodium hypophosphite ($NaH_2PO_2 \cdot H_2O$) in 550 ml. of water was prepared and heated to 85° C. To this was added, without reaction, 10 ml. of a 1 g./l. $PdCl_2$ solution. A separate solution of one normal sodium hydroxide (1 N NaOH) was prepared and 200 ml. of this solution was heated to 85° C. and poured into the cobalt bath with stirring. A gelatinous blue cobalt hydroxide solution was formed instantaneously, followed by a vigorous reaction during which a black, finely divided precipitate was formed. This reaction was allowed to proceed for one minute, the precipitate washed thoroughly with water and then with acetone, and dried in the absence of air.

The resulting particles were packed in a glass cylinder for measurement of magnetic properties by the VSM. The saturation magnetization per gram or sigma value was 113 e.m.u./g. at 4000 oersteds, and the intrinsic coercive force was 867 oersteds. Electron micrographs of the powder indicated that it consisted of spherical particles, less than one micron in diameter. Analysis indicated that the particles consisted essentially by weight of 0.7% phosphorus, less than 2% oxygen, the oxygen being limited almost entirely to the surface of the particles, and the balance cobalt.

TABLE II

| Example | Bath temperature, ° C. | Coercivity, oersteds | Percent phosphorus, by weight in particles |
|---|---|---|---|
| I | 85 | 867 | 0.7 |
| II | 75 | 928 | 0.6 |
| III | 65 | 1,127 | 0.6 |
| IV | 90 | 784 | 0.5 |

EXAMPLES II–IV

The bath of each example was prepared substantially in accordance with the details set forth in Example I, except that the reaction temperature of each example was varied as given in Table II. Each reaction was allowed to proceed for one minute. The formation of blue cobalt hydroxide followed by the formation of a black precipitate of finely divided cobalt-phosphorus alloy was noted in each reaction. The coercivity and percent phosphorus was obtained for each of the examples by the standard techniques previously described and are also listed in Table II.

The magnetic coercivity values of the examples were plotted against the reaction temperature in the solution in FIG. 1 as curve 12. It is, thereby seen that by merely selecting the temperature of the reaction bath as indicated by FIG. 1, cobalt-phosphorus alloy particles may be produced with the desired coercivity.

For comparison with the prior art, a series of similar reactions was carried out, with the exception that ammonium hydroxide, a base including a strong complexing agent, ammonia was utilized to render the reaction solution basic. The results of these reactions are plotted in FIG. 1 as curve 14. In none of these reactions was the formation of blue cobalt hydroxide precipitate noted prior to alloy formation. It can be seen, that by comparison, temperature variation in an ammonium hydroxide strongly complexed bath has no effect upon the coercivity of the resulting cobalt phosphorus alloy particles and also that the general level of coercivity obtained is much lower. When the reaction mixture is free of strong complexing agents, such as ammonia, coercivity is much higher and is inversely dependent upon bath temperature as illustrated by curve 12. It must be understood that curve 12 is indicative of the inverse dependence which exists between coercivity and temperature in weakly complexed particle preparation baths generally and that variations of other factors may cause the entire curve to raise, lower or vary its slope while still maintaining the inverse dependence noted.

A series of related experiments have measured other bath parameters of interest. It has been found that variation of the pH of the solution, whether controlled with non-complexing base or a complexing base as the source of hydroxide ion, has no effect on the coercivity of particles produced. Other experiments have indicated that the normality and amount of either the non-complexing base or the complexing base utilized to obtain a basic pH, at a given temperature, has no effect upon the coercivity of the resulting cobalt-phosphorus alloy particles. In a similar manner, it was determined experimentally, that the strength of the hypophosphite anion concentration, in the absence of strongly complexing ingredients has no effect upon the temperature-coercivity relationship of the resulting particles. Neither does mechanical agitation of the solution, as tested up to several hundred r.p.m., have any effect on the magnetic characteristics of the particles. Furthermore, as shown in Table II, the phosphorus content of the controlled coercivity alloy was found to be approximately constant throughout the temperature series so that in this case coercivity is independent of phosphorus content. It is therefore seen that the single apparent control of the coercivity of cobalt-phosphorus particles as produced by chemical reduction from a bath in the absence of strong complexing agent, is temperature selection. Finally, it was noted for strongly complexed baths, such as those which utilize ammonium to control pH, that coercivity is a function of hypophosphite anion concentration which results in wide variations of phosphorus content in the alloy particles. This, of course, is in agreement with the results reported for continuous film production.

The process of this invention is normally carried out under atmospheric conditions. However, moderate variations in pressure, may sometimes be desirable.

While a convenient method for carrying out the process of this invention is to place solutions of salt in a suitable container, such as glass, resin, or stainless steel, the invention may easily be modified for continuous operation. Reactants may be introduced into a reaction vessel or tube in appropriately proportioned quantities, and the reaction mixture, including the reaction products, continuously withdrawn. With this latter type of operation, much larger quantities of reactants can be efficiently and conveniently processed.

While water is a convenient solvent medium for carrying out the process of this invention, other media, including organic liquids, and especially water-miscible organic liquids can be used.

The use of weak complexing agents and buffering materials in the reaction bath, is a matter of technical choice. As is well known, these materials, and the techniques of using them, control the availability of various ions in the bath. Interestingly, in the past, complexing agents and buffers have often been used in electroless cobalt baths specifically to avoid the formation of cobalt hydroxide. In the present invention, the formation of cobalt hydroxide prior to precipitation is desired. It is, therefore, within the scope of this invention to use buffering and weak complexing agents in any manner which is consistent with the formation of blue cobalt hydroxide precipitate prior to alloy formation. Of course, the most crucial requirement in achieving this is the use of a non-complexing or weakly complexing base. However, other variations of the bath to avoid the formation of stable cobalt complexes and allow the formation of cobalt hydroxide prior to alloy formation are within the scope of this invention.

During mixing, the cobalt hydroxide precipitation step, or the cobalt cation reduction to cobalt, it may be advantageous to employ an ultrasonic field which aids in forming alloys having a very fine and uniform particle size range, which, in turn, leads to superior magnetic results in some instances. Such an ultrasonic field may be generated by commercially available devices which vibrate a blade at a high frequency, or by piezoelectric crystal transducers which convert electric energy into ultrasonic waves, or by other transducers which are described in the literature and known in the art. Low intensities are generally adequate to disperse the mixture or precipitate, where this is desired.

An external magnetic field affecting the reaction mixture during the formation of the alloy can be used to enhance the character of the particles formed, but it is not an essential feature of this invention. Where a DC magnetic field is utilized, it may be desirable to curtail both stirring and agitation in the bath, thereby encouraging the formation of acicular particles.

Uses for the materials produced in the foregoing examples are well known. The ferromagnetic alloy particles produced by the foregoing examples may be coated with non-magnetic organic film-forming materials. These coating materials may be organic polymers or non-magnetic fillers which have known utility in the preparation of magnetic recording media and magnetic responsive fluids, such as are used in electromagnetic clutches or electrostrictive fluid compositions.

Typical, but not limiting, binders for preparing various recording media including ferromagnetic particles produced in accordance with this invention are polyesters, cellulose esters and ethers, vinyl chloride, vinyl acetate, acrylate and styrene polymers and co-polymers, polyurethanes, polyamides, aromatic polycarbonates and polyphenyl ethers.

A wide variety of solvents may be used for forming a dispersion of the ferromagnetic particles and binders. Organic solvents, such as ethyl, butyl, and amyl acetate, isopropyl alcohol, dioxane, acetone, methylisobutyl ketone, cyclohexanone, and toluene are useful for this purpose. The particle-binder dispersion may be applied to a suitable substrate by roller coating, gravure coating, knife coating, extrusion, or spraying of the mixture onto the backing or by other known methods. The specific choice of non-magnetic substrate binder, solvent, or method of application of the magnetic composition to the support will vary with the properties desired and the specific form of the magnetic recording medium being produced.

In preparing recording media, the magnetic particles usually comprise about 40% to 90%, by weight, of the solids in the film layer applied to the substrate. The substrate is usually a flexible resin, such as polyester or cellulose acetate material; although other flexible materials as well as rigid base materials are more suitable for some uses.

In preparing magnetic cores and permanent magnets, the products of the examples are mixed with non-magnetic plastic or filler in amounts up to about 50%, by volume, of the magnetic material; the particles aligned in a magnetic field; and the mixture pressed into a firm magnet structure.

While the invention has been particularly shown and described with reference to preferred embodiments thereof, it will be understood by those skilled in the art that various changes in form and details may be made therein without departing from the spirit and scope of the invention.

What is claimed is:

1. A method for preparing finely divided magnetic cobalt-phosphorus alloy particles having selected coercivity, said process comprising:

preparing a solution consisting essentially of reducible cobalt cations, hypophosphite anions as a reducing agent and a non-complexing base as a source of hydroxyl anions to render the solution basic;

adjusting the solution to a selected temperature;

reacting the cobalt cations with the hydroxyl anions to produce a blue cobalt hydroxide percipitate; and then producing finely divided magnetic cobalt-phosphorus alloy particles by (oxidation-reduction) reduction of the cobalt cations to cobalt by the hypophosphite anions, the coercivity of said particles being inversely and functionally dependent on the temperature to which the solution is adjusted.

2. The method of claim 1, wherein catalytic material and a weak complexing agent are present in the reaction solution.

3. The method of claim 1, wherein the solution is aqueous and the temperature of the solution is adjusted in a range of about 65° C. to 90° C.

4. The method of claim 3, wherein cobalt cation is present in the solution in the concentration of about 6.0 to 8.0 grams per liter and hypophosphite anion is present in the solution at a concentration of 9.0 to 20.0 grams per liter.

5. The method of claim 1, wherein the non-complexing base is an alkaline hydroxide.

6. A method for preparing finely divided magnetic cobalt-phosphorus alloy particles having selected coercivity in the range of about 750 to 1200 oersteds, said process comprising:

preparing a solution consisting essentially of 35 g./l. cobalt sulfate, 20 g./l. sodium hypophosphite, 35 g./l. sodium citrate, 10 ml. of 1 g./l. palladium chloride solution, and 200 ml./l. of one normal sodium hydroxide;

adjusting the solution to a temperature in the range of about 65° to 90° C.;

reacting the cobalt cations with the hydroxyl anions to produce a blue cobalt hydroxide precipitate; and then initiating an oxidation-reduction reaction to produce finely divided magnetic cobalt-phosphorus alloy particles by reduction of the cobalt cations to cobalt by the hypophosphite anions said particles having controlled coercivity in the range of about 750 to 1200 oersteds, said coercivity being inversely and functionally dependent on the temperature to which the solution is adjusted, as set forth in FIG. 1 at curve 12.

References Cited

UNITED STATES PATENTS

| | | | |
|---|---|---|---|
| 3,607,218 | 9/1971 | Akashi et al. | 75—0.5 AA |
| 2,179,810 | 11/1939 | Brill et al. | 75—0.5 AA |
| 3,567,525 | 3/1971 | Graham et al. | 75—0.5 AAX |
| 3,535,104 | 10/1970 | Little, Jr. et al. | 148—105 X |
| 3,514,340 | 5/1970 | Larson et al. | 75—108 X |
| 3,494,760 | 2/1970 | Ginder | 75—108 X |
| 3,411,953 | 11/1968 | Larson et al. | 75—119 X |
| 3,423,214 | 1/1969 | Koretzky | 106—1 |
| 3,446,657 | 5/1969 | Dunlap, Jr. et al. | 117—240 |
| 3,360,397 | 12/1967 | Koretzky | 117—240 |
| 3,138,479 | 6/1964 | Foley | 117—47 |

OTHER REFERENCES

Tsu et al., Regulating Coercivity of Magnetic Thin Films, IBM Technical Disclosure Bulletin, vol. 4, No. 8, January 1962, pp. 52 and 53.

Wright, R. H., Control of Coercivity of Electrolessly Plated Cobalt-Phosphorus by Cobalt Ion Concentration, IBM Tech. Disclosure Bulletin, vol. 8, No. 9, February 1966, pp. 1175 and 1176.

Arcus et al., Control of Magnetic Properties of Electrolessly Deposited Cobalt Thin Films by Phosphorus Content, IBM Tech. Disclosure Bulletin, vol. 7, No. 9, February 1965, pp. 738, 739.

WAYLAND W. STALLARD, Primary Examiner

U.S. Cl. X.R.

75—0.5 AA, 108, 119